(12) United States Patent
Goodson et al.

(10) Patent No.: US 10,413,796 B2
(45) Date of Patent: Sep. 17, 2019

(54) SYSTEM AND METHOD FOR DISPLAYING SURF TRAINING INSTRUCTIONAL INFORMATION

(71) Applicants: Nathan Goodson, Vista, CA (US); Christine Decker, Vista, CA (US)

(72) Inventors: Nathan Goodson, Vista, CA (US); Christine Decker, Vista, CA (US)

(73) Assignees: Nathan Goodson, Oceanside, CA (US); Christy Decker, Oceanside, CA (US)

( * ) Notice: Subject to any disclaimer, the term of this patent is extended or adjusted under 35 U.S.C. 154(b) by 272 days.

(21) Appl. No.: 15/456,143

(22) Filed: Mar. 10, 2017

(65) Prior Publication Data
US 2017/0291088 A1    Oct. 12, 2017

Related U.S. Application Data

(60) Provisional application No. 62/307,403, filed on Mar. 11, 2016.

(51) Int. Cl.
*A63B 69/36* (2006.01)
*A63B 69/00* (2006.01)
*G01B 3/30* (2006.01)
*B63B 35/79* (2006.01)
*A63B 71/06* (2006.01)

(52) U.S. Cl.
CPC ...... *A63B 69/0093* (2013.01); *B63B 35/7906* (2013.01); *G01B 3/303* (2013.01); *A63B 2071/0694* (2013.01)

(58) Field of Classification Search
None
See application file for complete search history.

(56) References Cited

U.S. PATENT DOCUMENTS

| | | | | |
|---|---|---|---|---|
| 4,353,573 A * | 10/1982 | Morgan | ................. | B62B 13/00 280/601 |
| 4,990,113 A * | 2/1991 | Morrison | ............ | B63B 35/7993 441/75 |
| 5,509,871 A * | 4/1996 | Giovanni | ........... | A63B 69/0093 482/30 |
| 8,672,719 B2 * | 3/2014 | Grimes | ................... | B63B 35/73 114/364 |
| 8,758,206 B2 * | 6/2014 | Brown | ................... | A63B 22/16 434/247 |
| 8,864,639 B2 * | 10/2014 | Brown | ................... | A63B 22/16 482/146 |

\* cited by examiner

*Primary Examiner* — Sunit Pandya

(57) ABSTRACT

A system and method for displaying surf training instructional information is used to improve a user's pop-up, as it relates to popping up on a surfboard, and improving one's surf fitness. The visual illustrations indicates the position of a surfer's hands, their body when lying on their surfboard and/or where their feet should land when they pop-up into their surfing stance on a surfboard, which can engraved, drawn or painted onto a surface of any type. The system and method also has visual instructional guidelines for performing exercises and stretches that can be done to improve a user's surf strength, balance, flexibility and endurance. By using this system and method a user will improve their pop-up (jump) and overall surf fitness in order to become a better surfer.

19 Claims, 2 Drawing Sheets

SYSTEM AND METHOD FOR DISPLAYING SURF TRAINING INSTRUCTIONAL INFORMATION

CROSS REFERENCE TO RELATED APPLICATIONS

This application claims the benefit of priority under 35 USC § 119(e) to U.S. Provisional Patent Application Ser. No. 62/307,403, filed on Mar. 11, 2016 and titled: "SYSTEM AND METHOD FOR DISPLAYING SURF TRAINING INSTRUCTIONAL INFORMATION," the entire disclosure of which is hereby incorporated by reference in its entirety for all purposes.

TECHNICAL FIELD OF THE INVENTION

The disclosure generally relates the field of surf fitness, training and learning how to surf; and more particularly, to an instructional exercise system and method having illustrative visual displays for positioning thereon.

BACKGROUND OF THE INVENTION

When learning how to surf and training one's body in order to surf well, it is vital that one perfects their surf jump or "pop-up" surf stance and train their muscles needed to paddle, jump and maneuver their board when riding waves.

Currently, there are no fitness equipment tools, devices, systems, methods or designs that specifically focus on improving one's jump, as it relates to jumping up on a surfboard and improving one's surf fitness. The current training tools and equipment do not provide sufficient instructional information in order to teach an individual how they should position their body when they are laying on a surfboard; specifically, their hand placement aligning with their chest line, their head position, and their spine alignment with the stringer of the surfboard, as well as where their feet should land when they jump up onto their board. Nor do these tools and equipment identify the different parts of the surfboard, such as the nose, rail, tail and stringer of the surfboard, for a surfer to align with.

Therefore, a need exists for a design that can be used by individuals to track their progress as they improve their pop-up surf stance, their surfing stance and surf fitness. It is believed that such an invention will represent a significant advancement in surf ability, aptitude and fitness.

SUMMARY OF THE INVENTION

The disclosure addresses these needs and more by providing a system and method for displaying surf training instructional information.

The system and method enhances the field of surf fitness and provides the necessary instructional guide to improve an individual's pop-up surf stance, as it relates to their ability to pop-up on their surfboard in the proper surfing stance. As used in the art, a "pop-up" or jumping up is the act of going from the correct laying down position on a board or surface to the correct standing position (also known as a surf stance) in relative to surfing and improving one's ability to surf.

The visual instructional information that includes the proper hand and feet placement allows users to improve on their own time and in their own place.

It also provides for the user the instructional visual guidelines to fine tune their pop-up surf stance by providing a way to track their feet placement when they pop-up and work towards landing in the target feet placement area that lies in between their initial hand location.

Each specific element of the illustrations has a designated purpose and represents the body placement for specific exercises. The use of some of all of the elements described herein, are in the alternative embodiments of the system and method. However, the system and method for displaying surf training instructional information is primarily based on and includes the placement of the user's hands aligned with their chest line when laying down and the proper feet placement where their front foot lands in between their initial hand location when a user pops-up into a surfing stance and where their back foot lands in an area according to their height.

Described below are each of the different elements, including the ones mentioned above, that can be included in different embodiments of the system and method for instructional design and the purpose of their placement.

The initial standard hand placement on a board or surface is above the chest line and aligns with the front foot target area. It is the placement of a user's hands when laying down as they prepare for a pop-up.

The PRO shortboard hand placement is located below the chest line, this placement is where most advanced short board surfers will need to place their hands in order to pop-up on a shortboard with minimal use of their lower body.

The front foot (either right foot for a goofy stance or left foot for regular stance) is aligned with the primary hand placement as this is the target foot placement when standing in a surfing stance, aka the ideal foot placement for surfing.

The back foot placement is designed according to the user's height. The height lines placed on the traction pad provide the user with guidance on where their back foot should land when they pop-up, according to their height.

The numbered lines under the chest line allow users to track their improvement as their front foot starts further back and progresses forward toward the target front foot area.

The stringer of the surfboard is identified to show the center of the surfboard. A user's spine should align with the stringer when lying down. When in a surfer stance the user's feet should straddle the stringer (center of surfboard represented by a line) to provide the most ideal balance on the surfboard.

The rails are identified to assist beginners in identifying the different parts of the surfboard. The circle around the text is used for specific exercise drills where the user starts in a squatting surfer stance and reaches down to touch the rail circle and then stand up into surf stance. These exercises along with other variations using the identifiers are used to improve leg strength and flexibility.

The plank boxes identified as large rectangles are used for a specific full body on mat surf workout and training exercise that targets strengthening the muscles used when performing a duck dive as well as other upper body drills.

The eye line identifies the approximate placement and alignment for the user's head as it relates to their hand position and chest line laying down as they prepare for a pop-up.

The chest line indicates where a user's chest should align according to their hands when laying down preparing for their pop-up.

The action points identified by letters and numbers are strategically placed for exercise drills and stretches that are targeted towards improving the physical fitness of the user in order to improve their surf fitness and body coordination.

All of the specific elements illustrated through the surf training instructional system can co-exist with exercises, training tools and a program aimed specifically to promote the improvement of the user's pop-up, as it related to popping up on a surfboard, surfing technique, and improving the laser's fitness.

DETAILED DESCRIPTION OF THE EMBODIMENTS

The disclosure provides a system and method for displaying surf training instructional information that can be made by printing, engraving, illustrating, painting or drawing a design onto a flat, or concave surface, which includes all or some of the illustrations depicted in the figures. The flat or concave surface can be made of any material including but not limited to a yoga mat (PVC, rubber, jute, thermoplastic elastomer), carpet, foam or any other suitable fabric (soft) or hard material.

The system and method for displaying surf training instructional information can be used anywhere and at anytime. It provides users with the freedom to improve their surf fitness when they are unable to get out into the water.

The system focuses on several of the most crucial aspects of surfing movements with a high emphasis on nurturing and building the muscle groups targeted for the number one, most important part of surfing, the pop-up surf stance. The pop-up surf stance is, or will be, less than 1% of a surfers entire surfing experience, however it determines 99% of surfing success, and 100% of the likelihood that a user will continue to surf or be able to improve a user's surfing ability.

The pop-up surf stance is by definition and appearance, the simple concept of going from the laying down position to the standing position on a surfboard.

The pop-up surf stance is the most challenging aspect that an inexperienced surfer will face, one that seasoned surfers take years to cultivate and master. If a user has never surfed before, the surf pop-up surf stance is a completely foreign series of movements that their body has never experienced. It triggers a chain reaction of muscle groups that flex in a poetic series never assembled before in their body; not to mention, this occurs in a fraction of a second and while in the water on a surfboard. This is the pinnacle reason why people do not succeed at surfing or sticking with it even after experiencing some surfing success. It is not that surfing is hard; it is just something that the body has never done before. A person's body needs to learn, familiarize and memorize the movements. That is exactly what the disclosed system and method for displaying surf training instructional information provides, and can do so in the comfort and safety of a user's home.

The system and method for displaying surf training instructional information indicates the specific body placement when a user is on their surfboard preparing to undergo the pop-up surf stance and where their feet should land once the user pop-ups onto their surfboard. Each specific element of the illustration has a specific purpose and represents designated body placement for specific exercises.

Figure 1:
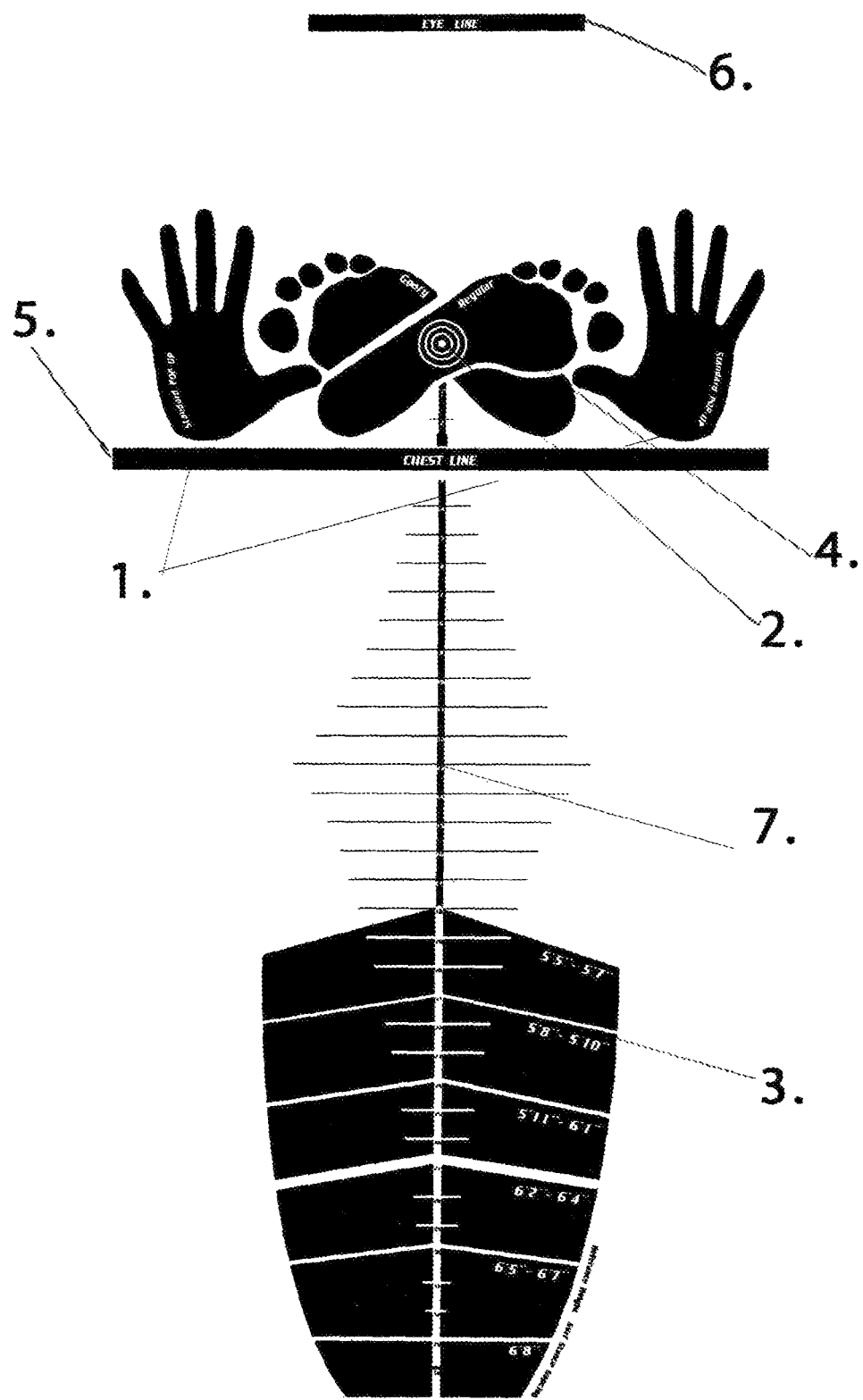
FIG. 1 provides a schematic diagram of an exemplary instructional exercise illustration in accordance with an embodiment of the present invention.

FIG. 1 provides a schematic diagram of an exemplary instructional exercise illustration in accordance with an embodiment that can be printed, engraved, illustrated, painted or drawn on any surface such as a yoga mat (PVC, rubber, jute, thermoplastic elastomer), foam, carpet or any other form of material. Although the illustration in this figure is rectangular in shape, there are various shapes that the illustration can be printed on.

FIG. 1 shows an example of the design that includes the following features:

A user's hand placement area (1) when laying down on a board or surface as the user prepares for a pop-up surf stance.

A front foot target area (2) for where the center of the user's front foot should land after they pop-up and stand in a surfing stance.

A back foot target area or height line (3) indicating the approximate location where a user's back foot should land after their pop-up surf stance according to their height.

A regular (left foot) and goofy (right foot) footprint area (4), indicating where the user's front foot, should land (in between their hands) once they pop-up and stand in a surfing stance.

A chest line (5) indicating where a user's chest should align on the board or surface according to the location of their hands when laying down preparing for their pop-up surf stance.

An eye line (6) indicating where a user's eyes should be aligned when laying down on a board or surface when preparing for their pop-up surf stance.

Measurement lines (7) that track the distance between a user's front foot and back foot. These lines can be used to track the progression as users track where their feet land when they pop-up and stand in surfing stance.

Figure 2:
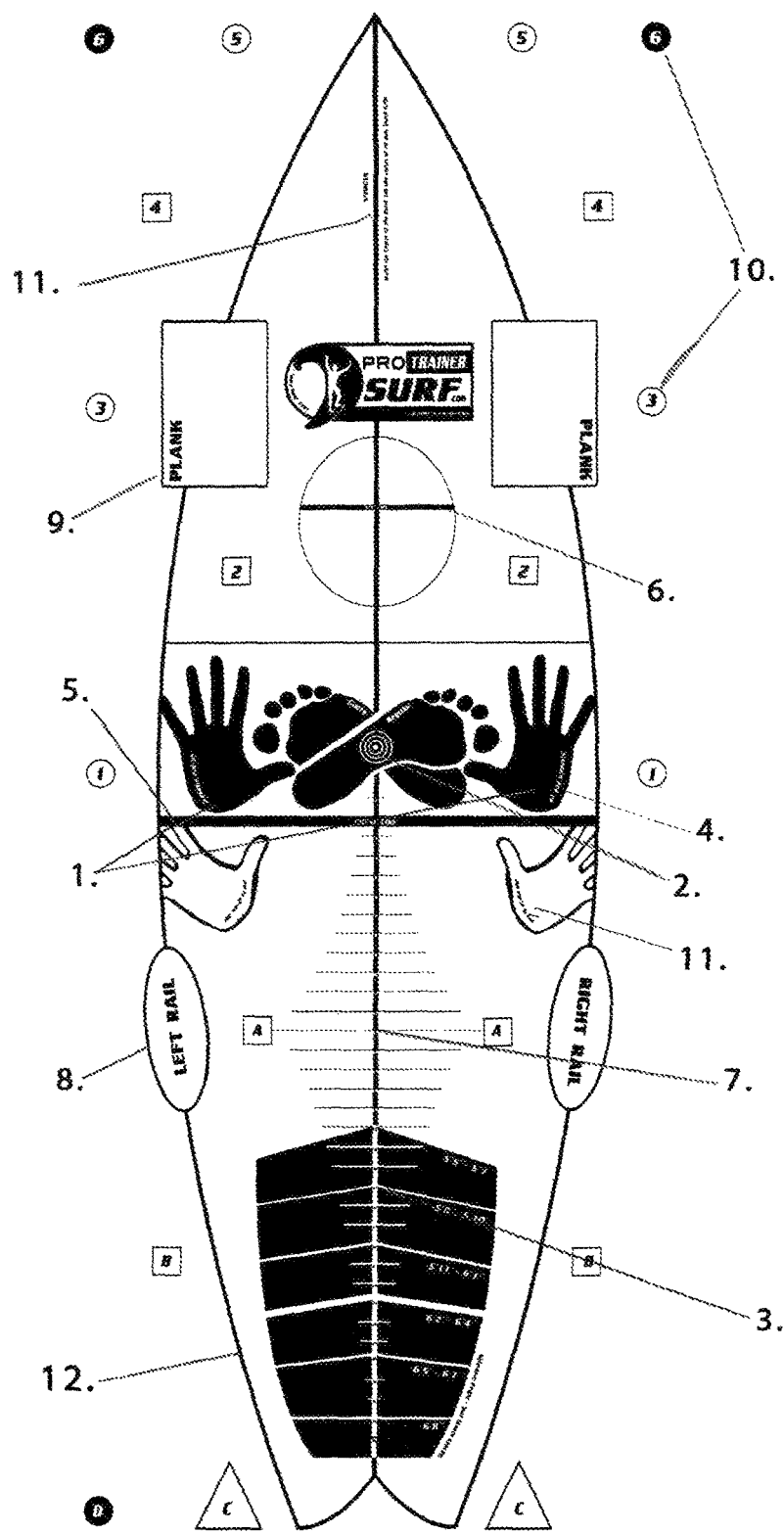
FIG. 2 provides a schematic diagram of another exemplary instructional exercise illustration in accordance with another embodiment of the present invention.

FIG. 2 provides a schematic diagram of an exemplary instructional exercise illustration in accordance with an embodiment that can be printed, engraved, illustrated, painted or drawn on any surface such as a yoga mat (PVC, rubber, jute, thermoplastic elastomer), foam, carpet or any other form of material. Although the illustration in this figure is rectangular in shape, there are various shapes that the illustration can be printed on.

FIG. 2 shows an example of the design that includes the following features:

A user's hand placement area (1) when laying down on a board or surface as the user prepares for a pop-up surf stance.

A front foot target area (2) for where the center of the user's front foot should land after they pop-up and stand in a surfing stance.

A back foot target area or height line (3) indicating the approximate location where a user's back foot should land after their pop-up surf stance according to their height.

A regular (left foot) and goofy (right foot) footprint area (4) indicating where the user's front foot should land (in between their hands) once they pop-up and stand in a surfing stance.

A chest line (5) indicating where a user's chest should align on the board or surface according to the location of their hands when laying down preparing, for their pop-up surf stance.

An eye line and head circle (6) indicating where a user's eyes should be aligned when laying down on the board or surface when preparing for their pop-up surf stance.

Measurement lines (7) that track the distance between a user's front foot and back foot. These lines can be used to track the progression as users track where their feet land when they pop-up and stand in surfing stance.

Left and right rails (8), which identify the location on the board or surface where a surfer will bend down a grab onto for a rail grab.

Plank boxes (9), which represent the space within the design where users can place their hands, get into a plank position and start fitness drills.

Action points (10), which are represented as indicators to use during body coordination drills (identified by letters and numbers).

A surfboard stringer (11), which is used to identify the center of the design and where a user should align the center of their body.

An outline of the board (12) is represented on the board or surface to indicate one representation of a surfboard.

Listed below are the primary exercises that a user can do using the system and method to develop the muscles, strength and flexibility needed to surf, which includes, but is not limited to: paddling, popping up and maneuvering when on a surfboard.

The following description provides examples of which the various systems and methods can be used for displaying surf training instructional information.

The pop-up: Beginning in the starting position, which is laying on the board, the user aligns their spine with the stringer of the board, places their chest along the chest line, places their hands on either the beginner hand placement or the advanced hand placement, aligns their head within the head circle and hover their eyes over the eye line. From this position the user quickly pushes up to arch their back and throw their legs under their body so that their front foot lands as close as it can to the target area. Once up the user stands in a surfer's stance with their knees bent, head facing forward and arms and elbow bent.

The user repeats this pop-up in various repetitions and sequences dependent on the routine. The goal is to perfect their pop-up so that they are quickly and precisely popping up where their front foot is landing in the target area and their back foot is landing on the traction pad in the appropriate height area.

The pop-up burpee: The pop-up burpee is the same as the pop-up but adds the following once they are up in surfer stance. From the surfer stance the user springs up and pop-ups, when they land, they quickly get back down on their stomach making sure they are aligned in the starting position.

The pop-up to switch foot jump: The pop-up switch foot jump is the same as the pop-up but adds the following once they are up in surfer stance. From the surfer stance the user springs up and jumps to switch feet position. The amount of times the user switches their stance before they spring back down to starting position is dependent on the user's particular routine.

The Surfer's push up: Starting in the starting position, which is laying on the board, the user aligns their spine with the stringer of the board, places their chest along the chest line, places their hands on either the beginner hand placement or the advanced hand placement, align their head within the head circle and hover their eyes over the eye line; they then do a series of pushups dependent on the users particular routine.

The rail grab squat: Standing in a surfer stance with their knees bent, head facing forward and anus and elbow bent; the user reaches to one side to place their back hand down onto the rail grab circle and then springs up to straight legs. Then they return to surfer stance and changes sides squatting back to the opposite rail grab to place the backhand on the rail grab. The repetition and sequence is dependent on the user's particular routine.

The duck dive push up: The user places their hands on the plank boxes. From a plank position, they slowly bend their elbows to hover a few inches above the ground and then bring their head forward and arch their back. Once their elbows are straight and their back arched, they then reverse the motion so they end up back in plank. The repetition and sequence is dependent on the user's particular routine.

There are many more exercises that a user can do with the system and method for displaying surf training instructional information that will be available to the user through an instructional online guide, physical guide, online videos, and DVD videos. The use of the system and method for displaying surf training instructional information is only limited by the user's imagination on how it can be used.

It should be readily understood by those persons skilled in the art that the present disclosure is susceptible of a broad utility and application. Many embodiments and adaptations of the present disclosure other than those herein described, as well as many variations, modifications and equivalent arrangements can be apparent from or reasonably suggested by the present disclosure and the foregoing description thereof, without departing from the substance or scope of the present invention. Accordingly, while the present disclosure has been described herein in detail in relation to its embodiments, it is to be understood that this disclosure is only illustrative and exemplary of the present disclosure and is made merely for purposes of providing a full and enabling disclosure of the invention. The foregoing disclosure is not intended or to be construed to limit the present disclosure or otherwise to exclude any such other embodiment, adaptations, variations, modifications and equivalent arrangements, the present disclosure being limited only by the claims appended hereto and the equivalents thereof.

We claim:

1. A system for surf training or surf fitness instructional information, comprising: a board or surface having a plurality of identifying marks, wherein the plurality of identifying marks include:
   a chest line area indicating where a user's chest is located when the user is laying on the board or surface;
   an eye line indicating where the user's eyes are aligned when the user is laying on the board or surface;
   a hand placement area indicating where the user's hands are located when the user is laying on the board or surface;
   a front foot target area indicating where the user's front foot is located when the user is standing on the board or surface;
   a back foot target area or height line area indicating where the user's back foot is located according to their height when the user is standing on the board or surface; and
   a plurality of measurement lines for tracking a distance between the users' front foot and the user's back foot when the user is standing on the board or surface.

2. The system of claim 1, further comprising:
   a front footprint area in the front foot target area indicating where the user's front foot is located when the user is standing on the board or surface.

3. The system of claim 1, further comprising a left rail and a right rail indicating where the user can bend down and grab onto a rail grab when the user is standing on the board or surface.

4. The system of claim 1, further comprising one or more plank boxes indicating where the user can place their hands, get into a plank position and conduct fitness drills when the user is standing on the board or surface.

5. The system of claim 1, further comprising an action point identified by letters and numbers indicating where the user can use exercise drills and stretches during body physical fitness and body coordination drills.

6. The system of claim 1, further comprising a surfboard stringer indicating a center of the board or surface where the user aligns a center of their body when the user is laying on the board or surface.

7. The system of claim 1, further comprising an outline on the board or surface indicating a representation of a surfboard.

8. The system of claim 1, wherein the plurality of identifying marks are printed, engraved, illustrated, painted, or drawn onto the board or surface.

9. The system of claim 1, wherein the board or surface is polyvinyl chloride, rubber, jute, thermoplastic elastomer carpet, or a foam mat.

10. The system of claim 1, wherein the board or surface is a flat or concave board or surface.

11. A method for surf training or surf fitness instructional information comprising a board or surfaces the method comprising:
   a user pushing upwards with their arms, arching their back, and throwing their legs under their body so that their front foot lands in a front foot target area and their back foot lands in a back foot target area according to their height; and standing up in a surfer's stance with the users' knees bent, head feeing forwards, and arms and elbows bent, wherein the board or surface having a plurality of identifying marks, wherein the plurality of identifying marks include:
   a chest line area indicating where a user's chest is located when the user is laying on the board or surface;
   an eye line indicating where the user eyes are aligned when the user is laying on the board or surface;
   a hand placement area indicating where the users' hands are located when the user is laying on the board or surface;
   a front foot target area indicating where the user's front foot is located when the user is standing on the board or surface;
   a back foot target area or height line area indicating where the user's back foot is located according to their height when the user is standing on the board or surface; and
   a plurality of measurement lines for tracking a distance between the user's front foot and the user's back foot when the user is standing on the board or surface.

12. The method of claim 1, further comprising:
   a front footprint area in the front foot target area indicating where the user's front foot is located when the user is standing on the board or surface.

13. The method of claim 11, further comprising a left rail and a right rail indicating where the user can bend down and grab onto a rail grab when the user is standing on the board or surface.

14. The method of claim 11, further comprising one or more plank boxes indicating where the user can place their hands, get into a plank position and conduct fitness drills when the user is standing on the board or surface.

15. The method of claim 11, further comprising an action point identified by letters and numbers indicating where the user can use exercise drills and stretches during body physical fitness and body coordination drills.

16. The method of claim 11, further comprising a surfboard stringer indicating a center of the board or surface where the user aligns a center of their body when the user is laying on the board or surface.

17. The method of claim 11, further comprising an outline on the board or surface indicating a representation of a surfboard.

18. The method of claim 11, wherein the plurality of identifying marks are printed, engraved, illustrated, painted, or drawn onto the board or surface.

19. The method of claim 11, wherein the board or surface is a flat or concave board or surface.

* * * * *